United States Patent
Yasukawa et al.

(10) Patent No.: US 11,792,206 B2
(45) Date of Patent: Oct. 17, 2023

(54) RELAY METHOD, RELAY SYSTEM, AND RELAY PROGRAM

(71) Applicant: SORACOM, INC., Tokyo (JP)

(72) Inventors: Kenta Yasukawa, Tokyo (JP); Motokatsu Matsui, Tokyo (JP); Taiki Kawakami, Tokyo (JP)

(73) Assignee: SORACOM, INC., Tokyo (JP)

(*) Notice: Subject to any disclaimer, the term of this patent is extended or adjusted under 35 U.S.C. 154(b) by 49 days.

(21) Appl. No.: 17/367,750

(22) Filed: Jul. 6, 2021

(65) Prior Publication Data

US 2021/0336967 A1  Oct. 28, 2021

Related U.S. Application Data (63) Continuation of application No. PCT/JP2020/023417, filed on Jun. 15, 2020.

(30) Foreign Application Priority Data

Jul. 1, 2019 (JP) ................................. 2019-122756

(51) Int. Cl.
*G06F 7/04* (2006.01)
*G06F 15/16* (2006.01)
(Continued)

(52) U.S. Cl.
CPC ........... *H04L 63/108* (2013.01); *H04W 12/08* (2013.01); *H04L 47/286* (2013.01); *H04L 61/5007* (2022.05); *H04L 67/10* (2013.01)

(58) Field of Classification Search
CPC .............................. H04L 63/108; H04W 12/08
(Continued)

(56) References Cited

U.S. PATENT DOCUMENTS

2008/0104687 A1* 5/2008 Fujiwara ............... H04W 12/06
726/10
2009/0164637 A1* 6/2009 Tanimoto ............. H04L 67/563
709/226

(Continued)

FOREIGN PATENT DOCUMENTS

| CN | 103503384 A | 8/2014 |
|----|-------------|--------|
| CN | 105684549 A | 6/2016 |

(Continued)

*Primary Examiner* — Jeffrey C Pwu
*Assistant Examiner* — Samuel Ambaye
(74) *Attorney, Agent, or Firm* — WCF IP (57) ABSTRACT

A connection management apparatus of a relay system specifies, when terminal identification information for identifying a target terminal is acquired from a client terminal, a first relay apparatus that relays communication, and specifies connecting information for the client terminal to connect to the first relay apparatus. The connection management apparatus stores the specified connecting information and the terminal identification information in a storage in association with each other, and notifies the client terminal of the specified connecting information. When the specified first relay apparatus receives access based on the connecting information from the client terminal, the specified first relay apparatus relays the communication between the client terminal and the target terminal on the basis of the terminal identification information associated with the connecting information.

15 Claims, 6 Drawing Sheets

(51) Int. Cl.
  *H04L 29/06*    (2006.01)
  *H04L 9/40*     (2022.01)
  *H04W 12/08*    (2021.01)
  *H04L 47/28*    (2022.01)
  *H04L 67/10*    (2022.01)
  *H04L 61/5007*  (2022.01)

(58) Field of Classification Search
  USPC .......................................................... 726/3
  See application file for complete search history.

(56) References Cited

U.S. PATENT DOCUMENTS

| | | |
|---|---|---|
| 2014/0056305 A1 | 2/2014 | Tanimoto |
| 2014/0177840 A1 | 6/2014 | Liu |
| 2016/0226953 A1* | 8/2016 | Ishino ..................... H04L 67/10 |
| 2016/0286459 A1 | 9/2016 | Enomoto et al. |
| 2018/0041433 A1* | 2/2018 | Chen ....................... H04L 67/01 |
| 2019/0262967 A1 | 8/2019 | Tognoni et al. |

FOREIGN PATENT DOCUMENTS

| | | |
|---|---|---|
| JP | 2012-504384 A | 2/2012 |
| JP | 2012227834 A | 11/2012 |
| JP | 2013-098761 A | 5/2013 |
| JP | 5973049 B | 8/2016 |
| JP | 2018-152691 A | 9/2018 |

* cited by examiner

RELAY METHOD, RELAY SYSTEM, AND RELAY PROGRAM

CROSS-REFERENCE TO RELATED APPLICATIONS

The present application is a continuation application of International Application No. PCT/JP2020/023417, ed on Jun. 15, 2020, which claims priority to Japanese Patent Application No. 2019-122756, filed on Jul. 1, 2019. The contents of this application are incorporated herein by reference in their entirety.

BACKGROUND OF THE INVENTION

The present disclosure relates to a relay method, a relay system, and a relay program for relaying communication between a client terminal and a target terminal.

In order to maintain, operate, and manage an Internet of Things (IoT) system, access to a target terminal serving as an IoT device is being made possible. As a method for a user to access a target terminal, Japanese Patent Publication No. 5973049 discloses a system that notifies the user of a global IP address assigned to the target terminal in response to a request from the user.

By assigning a global IP address to a target terminal, a user can easily access the target terminal using the global IP address. However, when a global IP address is assigned to a target terminal, a third party other than the user can access the target terminal, resulting in a security risk.

BRIEF SUMMARY OF THE INVENTION

The present disclosure focuses on these points and an object of the present disclosure is to provide a relay method, a relay system, and a relay program which allow secure access to a target terminal.

A relay method according to the first aspect of the present disclosure is a relay method performed by a relay system that relays communication between a client terminal and a target terminal that is a communication destination of the client terminal, the method includes acquiring terminal identification information for identifying the target terminal from the client terminal, when the terminal identification information is acquired, specifying a first relay apparatus that relays the communication among a plurality of relay apparatuses included in the relay system, and specifying connecting information for the client terminal to connect to the first relay apparatus, storing the connecting information and the terminal identification information in a storage in association with each other, notifying the client terminal about the specified connecting information, and when the first relay apparatus receives access based on the connecting information from the client terminal, relaying communication between the client terminal and the target terminal on the basis of the terminal identification information associated with the connecting information in the storage.

A relay apparatus according to the second aspect of the present disclosure is a relay apparatus for relaying communication between a client terminal and a target terminal that is a communication destination of the client terminal, includes an acquisition part that acquires terminal identification information for identifying the target terminal from the client terminal, a specification part that, when the terminal identification information is acquired, specifies a first relay apparatus that relays the communication among a plurality of relay apparatuses included in the relay system, and specifies connecting information for the client terminal to connect to the first relay apparatus, a storage controller that stores the connecting information in a storage in association with the terminal identification information, and a notification part that notifies the client terminal about the specified connecting information.

A relay method according to the third aspect of the present disclosure is a relay system including a connection management apparatus and a plurality of relay apparatuses, the relay system relaying communication between a client terminal and a target terminal that is a communication destination of the client terminal, wherein the connection management apparatus includes an acquisition part that acquires terminal identification information for identifying the target terminal from the client terminal, a specification part that, when the terminal identification information is acquired, specifies a first relay apparatus that relays the communication among a plurality of relay apparatuses included in the relay system, and specifies connecting information for the client terminal to connect to the first relay apparatus, a storage controller that stores the connecting information in a storage in association with the terminal identification information, and a notification part that notifies the client terminal about the specified connecting information, wherein the first relay apparatus includes a relay part that, when the first relay apparatus receives access based on the connecting information from the client terminal, relays the communication between the client terminal and the target terminal on the basis of the terminal identification information associated with the connecting information in the storage.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[An Outline of a Relay System S]

Figure 1:
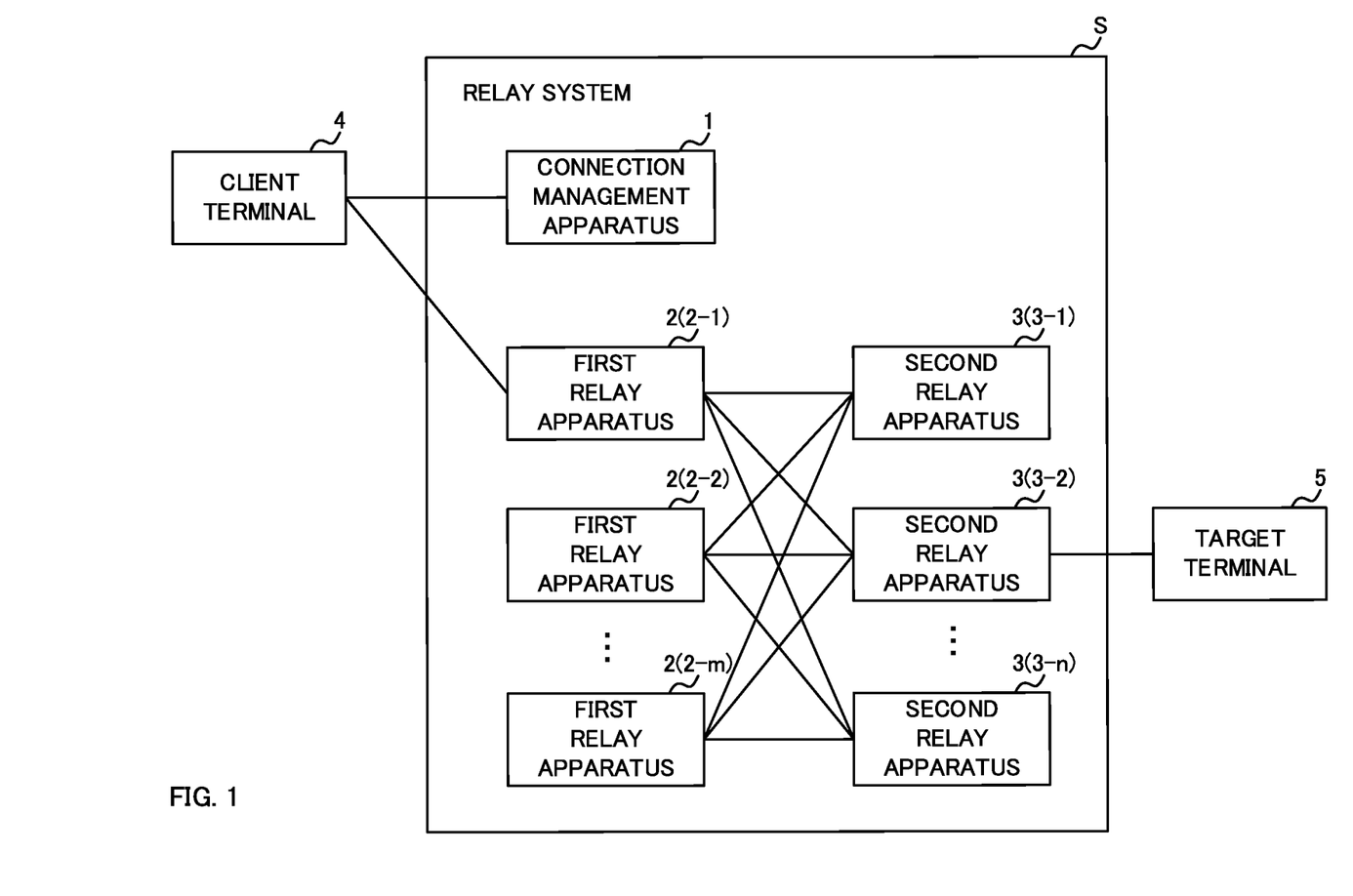
FIG. 1 shows an outline of a relay system according to the present embodiment.

FIG. 1 shows an outline of a relay system S according to the present embodiment. The relay system S is a system that relays communication between a client terminal 4 and a target terminal 5 serving as an IoT device.

The relay system S includes a connection management apparatus 1 and a plurality of first relay apparatuses 2 and a plurality of second relay apparatuses 3 constituting a mobile network of 4G, 5G, or the like. The first relay apparatus 2 is a proxy server located in a network outside a core network of the mobile network. The second relay apparatus 3 is a proxy server located in a network inside the core network of the mobile network. The target terminal 5 is located in the mobile network and is assigned with a private IP address in the mobile network. The target terminal 5 is connected to any of the plurality of second relay apparatuses 3. It should be noted that only one target terminal 5 is shown in FIG. 1, but it is assumed that a plurality of target terminals 5 actually exist.

The connection management apparatus 1 of the relay system S acquires a Subscriber Identity Module (SIM) unique number as terminal identification information for identifying the target terminal 5 which is a terminal to be accessed remotely by the client terminal 4. The SIM unique number is the International Mobile Subscriber Identity (IMSI), for example.

When the connection management apparatus 1 acquires the SIM unique number from the client terminal 4, the connection management apparatus 1 specifies the first relay apparatus 2 that relays the communication between the client terminal 4 and the target terminal 5 among the plurality of first relay apparatuses 2, and specifies connecting information for the client terminal 4 to connect to the first relay apparatus 2. In an example shown in FIG. 1, the connection management apparatus 1 specifies a first relay apparatus 2-1 as the first relay apparatus 2 that relays the communication between the client terminal 4 and the target terminal 5, and specifies the connecting information for the client terminal 4 to connect to the first relay apparatus 2-1.

The connection management apparatus 1 stores the specified connecting information and the SIM unique number in a storage in association with each other and notifies the client terminal 4 of said connecting information. The client terminal 4 accesses any of the plurality of first relay apparatuses 2 on the basis of the connecting information notified from the connection management apparatus 1. The first relay apparatus 2 accessed by the client terminal 4 specifies the second relay apparatus 3 to which the target terminal 5 is connected on the basis of the SIM unique number associated with the connecting information in the storage, and relays the communication between the client terminal 4 and the target terminal 5 through the specified second relay apparatus 3.

In the example shown in FIG. 1, the first relay apparatus 2-1 specifies a second relay apparatus 3-2 as the second relay apparatus 3 to which the target terminal 5 is connected. The first relay apparatus 2-1 relays the communication between the client terminal 4 and the target terminal 5 via the second relay apparatus 3-2.

As described above, since the relay system S can change the first relay apparatus 2, which is a connection destination to which the client terminal 4 connects in order to communicate with the target terminal 5, it is difficult for a third party to specify the first relay apparatus 2 that is the connection destination, thereby increasing security.

[A Configuration of the Connection Management Apparatus 1]

Figure 2:
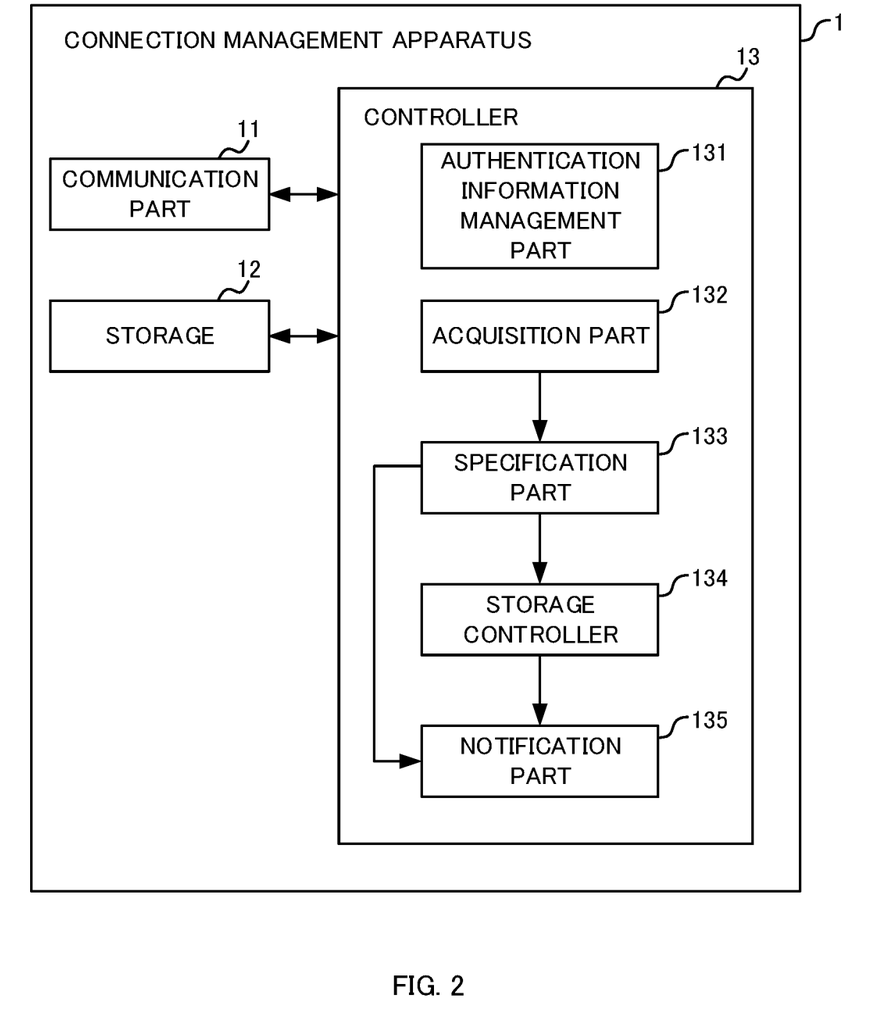
FIG. 2 shows a configuration of a connection management apparatus according to the present embodiment.

Next, configurations of the connection management apparatus 1, the first relay apparatus 2, and the second relay apparatus 3 included in the relay system S will be described. First, a configuration of the connection management apparatus 1 will be described. FIG. 2 shows the configuration of the connection management apparatus 1 according to the present embodiment. As shown in FIG. 2, the connection management apparatus 1 includes a communication part 11, a storage 12, and a controller 13.

The communication part 11 is a communication interface for communicating with the client terminal 4.

The storage 12 is a storage medium including a Read Only Memory (ROM), a Random Access Memory (RAM), and the like. The storage 12 stores a program to be executed by the controller 13. For example, the storage 12 stores a program for a management apparatus that causes the controller 13 to function as an authentication information management part 131, an acquisition part 132, a specification part 133, a storage controller 134, and a notification part 135. The program for a management apparatus is a portion of a relay program for relaying the communication between the client terminal 4 and the target terminal 5.

The controller 13 is a Central Processing Unit (CPU), for example. The controller 13 functions as the authentication information management part 131, the acquisition part 132, the specification part 133, the storage controller 134, and the notification part 135 by executing the program for a management apparatus stored in the storage 12. Details of these functions will be described later.

[A Configuration of the First Relay Apparatus 2]

Figure 3:
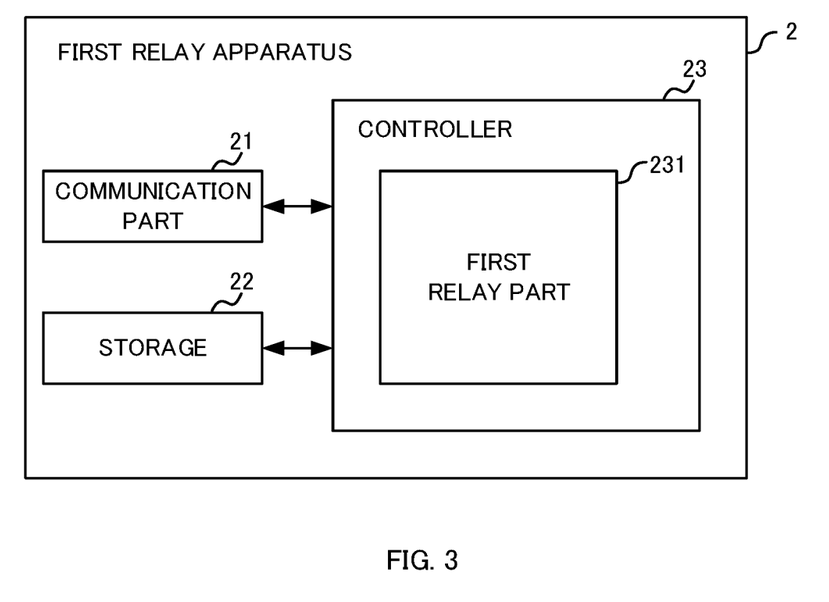
FIG. 3 shows a configuration of a first relay apparatus according to the present embodiment.

Next, a configuration of the first relay apparatus 2 will be described. FIG. 3 shows the configuration of the first relay apparatus 2 according to the present embodiment. As shown in FIG. 3, the first relay apparatus 2 includes a communication part 21, a storage 22, and a controller 23.

The communication part 21 is a communication interface for communicating with the connection management apparatus 1, the second relay apparatus 3, and the client terminal 4.

The storage 22 is a storage medium including a ROM, a RAM, and the like. The storage 22 stores a program to be executed by the controller 23. For example, the storage 22 stores a program for a first relay apparatus that causes the controller 23 to function as a first relay part 231. The program for a first relay apparatus is a portion of the relay program for relaying the communication between the client terminal 4 and the target terminal 5.

The controller 23 is a CPU, for example. The controller 23 functions as the first relay part 231 by executing the program for a first relay apparatus stored in the storage 22. Details of the function of the first relay part 231 will be described later.

[A Configuration of the Second Relay Apparatus 3]

Figure 4:
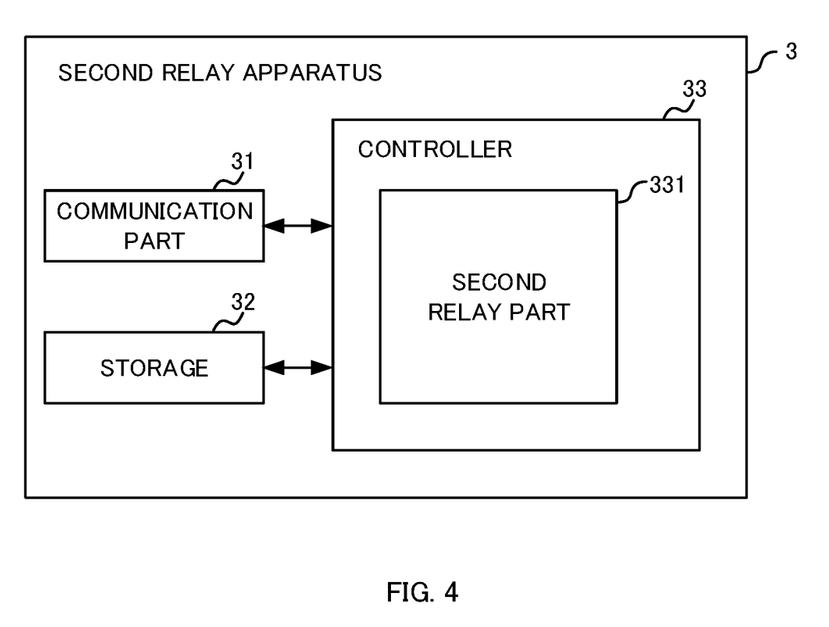
FIG. 4 shows a configuration of a second relay apparatus according to the present embodiment.

Next, a configuration of the second relay apparatus 3 will be described. FIG. 4 shows the configuration of the second relay apparatus 3 according to the present embodiment. As shown in FIG. 4, the second relay apparatus 3 includes a communication part 31, a storage 32, and a controller 33.

The communication part 31 is a communication interface for communicating with the first relay apparatus 2 and the target terminal 5.

The storage 32 is a storage medium including a ROM, a RAM, and the like. The storage 32 stores a program to be executed by the controller 33. For example, the storage 32 stores a program for a second relay apparatus that causes the controller 33 to function as a second relay part 331. The program for a second relay apparatus is a portion of the relay program for relaying the communication between the client terminal 4 and the target terminal 5.

The controller 33 is a CPU, for example. The controller 33 functions as the second relay part 331 by executing the program for a second relay apparatus stored in the storage 32. Details of the function of the second relay part 331 will be described later.

Subsequently, the controller 13 of the connection management apparatus 1, the controller 23 of the first relay apparatus 2, and the controller 33 of the second relay apparatus 3 will be described in detail. In the following explanation, the function of each controller will be described in detail by referring to the sequence diagrams as appropriate.

[Registering Authentication Information]

Figure 5:
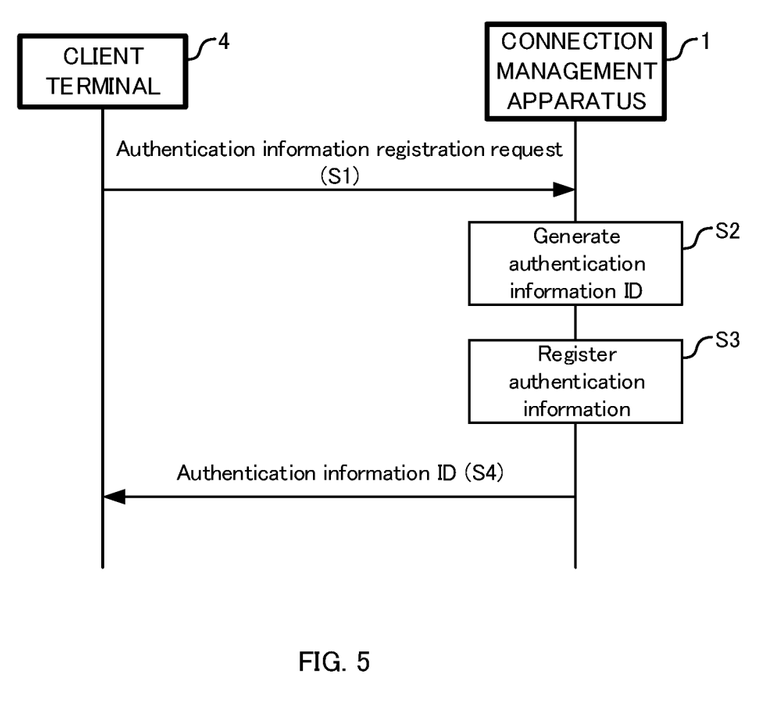
FIG. 5 is a sequence diagram showing a process relating to registering authentication information.

First, the function relating to registering authentication information of the client terminal 4 will be described in detail. The function relating to registering the authentication information is achieved by the authentication information management part 131. FIG. 5 is a sequence diagram showing a process relating to registering authentication information.

The authentication information management part 131 acquires, from the client terminal 4, an authentication information registration request for requesting registration of authentication information used for client authentication (step S1). The client authentication is performed by verifying whether or not the client information (authentication information) generated by the certificate authority is correct. The client information is transmitted when the client terminal 4 communicates. The authentication information registration request includes, as the authentication information, a) certificate authority information indicating the certificate authority that generated the client information and b) a public key for generating a hash value based on the client information, for example.

When the authentication information management part 131 acquires the authentication information registration request, the authentication information management part 131 generates an authentication information ID for identifying the authentication information (step S2).

Next, the authentication information management part 131 registers the authentication information by storing the generated authentication information ID and the authentication information in the storage 12 in association with each other (step S3).

Subsequently, the authentication information management part 131 transmits the generated authentication information ID to the client terminal 4 (step S4). [Specifying the First Relay Apparatus 2 that Relays Communication]

Figure 6:
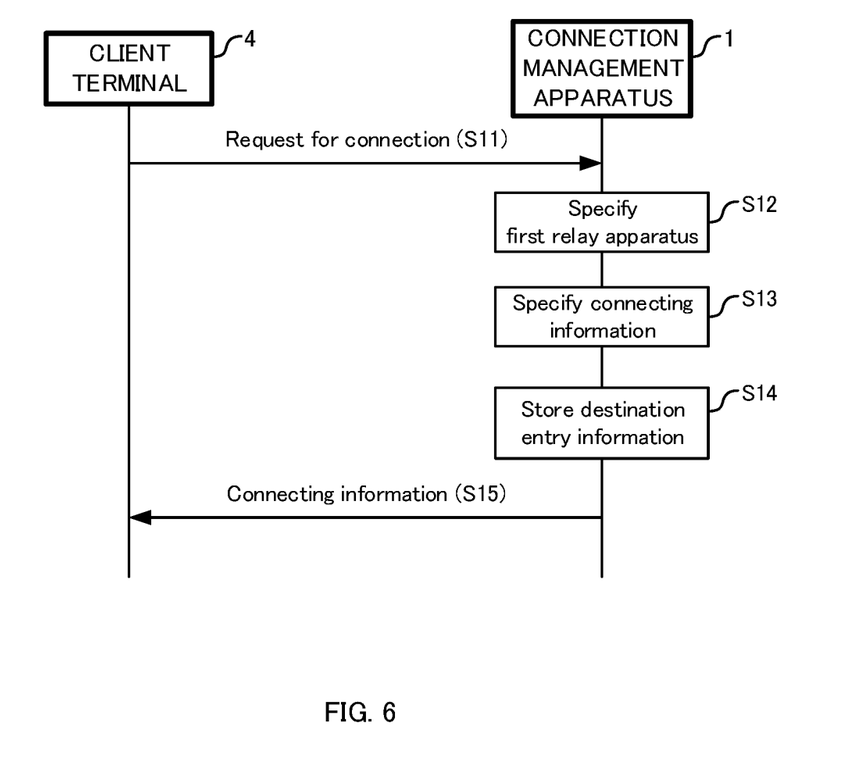
FIG. 6 is a sequence diagram showing a process for specifying the first relay apparatus that relays communication.

Next, a function related to specifying the first relay apparatus 2 that relays the communication when the client terminal 4 communicates with the target terminal 5 will be described in detail. The function related to specifying the first relay apparatus 2 is achieved by the acquisition part 132, the specification part 133, the storage controller 134, and the notification part 135 of the connection management apparatus 1. FIG. 6 is a sequence diagram showing a process for specifying the first relay apparatus 2 that relays the communication. It is assumed that a user of the client terminal 4 knows in advance the SIM unique number for identifying the target terminal 5.

The acquisition part 132 acquires a request to connect to the target terminal 5 from the client terminal 4 (step S11). Specifically, the acquisition part 132 acquires a connection request including the SIM unique number for identifying the target terminal 5 and a port number of the target terminal 5 that are used when the target terminal 5 communicates.

The acquisition part 132 may acquire, from the client terminal 4, connection condition information indicating a connection condition when making a connection with the target terminal 5, together with the connection request. Specifically, the acquisition part 132 may acquire, as the connection condition information, at least any of a) a Time To Live (TTL) value as validity period information indicating a period in which the communication between the client terminal 4 and the target terminal 5 is available and b) client address information indicating an IP address range of the client terminal 4 when the client terminal 4 communicates with the target terminal 5.

Further, the acquisition part 132 may acquire, from the client terminal 4, the authentication information ID used for the client authentication together with the connection request.

When the connection request is acquired, the specification part 133 specifies the first relay apparatus 2 that relays the communication between the client terminal 4 and the target terminal 5 among the plurality of first relay apparatuses 2 included in the relay system S (step S12). For example, the specification part 133 specifies any one of the plurality of first relay apparatuses 2 as the first relay apparatus 2 that relays the communication between the client terminal 4 and the target terminal 5.

It should be noted that the specification part 133 may specify a first relay apparatus 2 belonging to an area to which the client terminal 4 belongs as the first relay apparatus 2 that relays the communication between the client terminal 4 and the target terminal 5. In this case, the storage 12 stores address information by areas, in which a) IP addresses of the plurality of first relay apparatuses 2 and b) areas where the first relay apparatuses 2 are located are associated with each other. The specification part 133 specifies the address of the client terminal 4 that requested the connection, and specifies the area to which the client terminal 4 belongs on the basis of the specified address. The specification part 133 refers to the address information by areas, and specifies any one of the plurality of first relay apparatuses 2 belonging to the area to which the specified client terminal 4 belongs, as the first relay apparatus 2 that relays the communication between the client terminal 4 and the target terminal 5. In this manner, the client terminal 4 can access the first relay apparatus 2 located in the same area, thereby suppressing a delay in communication between the client terminal 4 and the first relay apparatus 2.

Further, the specification part 133 may specify the first relay apparatus 2 operated by a telecommunication company, having a contract for the client terminal 4, as the first relay apparatus 2 that relays the communication between the client terminal 4 and the target terminal 5. In this way, the cost related to relaying the communication between the client terminal 4 and the target terminal 5 can be reduced. In addition, the specification part 133 may specify a first relay apparatus 2 having a smaller load as the first relay apparatus 2 that relays the communication between the client terminal 4 and the target terminal 5 on the basis of the number of terminals accommodated in the first relay apparatus 2 or the traffic volume in the first relay apparatus 2. In this manner, the delay of communication between the client terminal 4 and the first relay apparatus 2 can be suppressed.

The specification part 133 specifies the IP address and a port number of the first relay apparatus 2, as connecting information for connecting the client terminal 4 to the specified first relay apparatus 2 (step S13). For example, the specification part 133 specifies the port number of the first relay apparatus 2 by selecting any one of a plurality of port numbers within a predetermined range. Thus, the connection management apparatus 1 can make it difficult for a third party to specify the port number used by the first relay apparatus 2 to communicate with the client terminal 4 and the target terminal 5.

The storage controller 134 stores, in the storage 12, destination entry information, in which the connecting information specified by the specification part 133, the SIM unique number of the target terminal 5 acquired by the acquisition part 132, and the port number of the target terminal 5 are associated with each other (step S14).

When the acquisition part 132 acquires the connection condition information, the storage controller 134 stores said connection condition information (expiration time corresponding to the TTL and client address information) in association with the connecting information. For example, when the TTL value is acquired as the connection condition information, the storage controller 134 sets the time at which the period during which the communication between the client terminal 4 and the target terminal 5 is available ends, as the communication expiration time on the basis of the current time and the TTL value, and stores the communication expiration time in association with the connecting information. Further, when the acquisition part 132 acquires the authentication information ID, the storage controller 134 stores the authentication information ID in association with the connecting information. In the following explanation, it is assumed that the acquisition part 132 has acquired the authentication information ID.

The notification part 135 notifies the client terminal 4 that sent the connection request about the connecting information including the IP address and the port number of the first relay apparatus 2 specified by the specification part 133 (step S15). Although the notification part 135 notifies the client terminal 4 about the connecting information, the present disclosure is not limited thereto, and the destination entry information including the connecting information may be provided to the client terminal 4.

[Relay of Communication by the Specified First Relay Apparatus 2]

When the connecting information is provided to the client terminal 4, the client terminal 4 can access the specified first relay apparatus 2 on the basis of the connecting information. When the specified first relay apparatus 2 receives access from the client terminal 4 based on the IP address and the port number of the first relay apparatus 2 included in the connecting information, the specified first relay apparatus 2 relays the communication between the client terminal 4 and the target terminal 5.

Specifically, when the first relay part 231 of the first relay apparatus 2 receives the access from the client terminal 4 by acquiring the connection request based on the connecting information from the client terminal 4, the first relay part 231 relays the communication between the client terminal 4 and the target terminal 5 on the basis of the SIM unique number associated with the connecting information in the storage 12 of the connection management apparatus 1. The first relay part 231 specifies the second relay apparatus 3 to which the target terminal 5 is connected on the basis of said SIM unique number, and relays the communication between the client terminal 4 and the target terminal 5 via the specified second relay apparatus 3.

Figure 7:
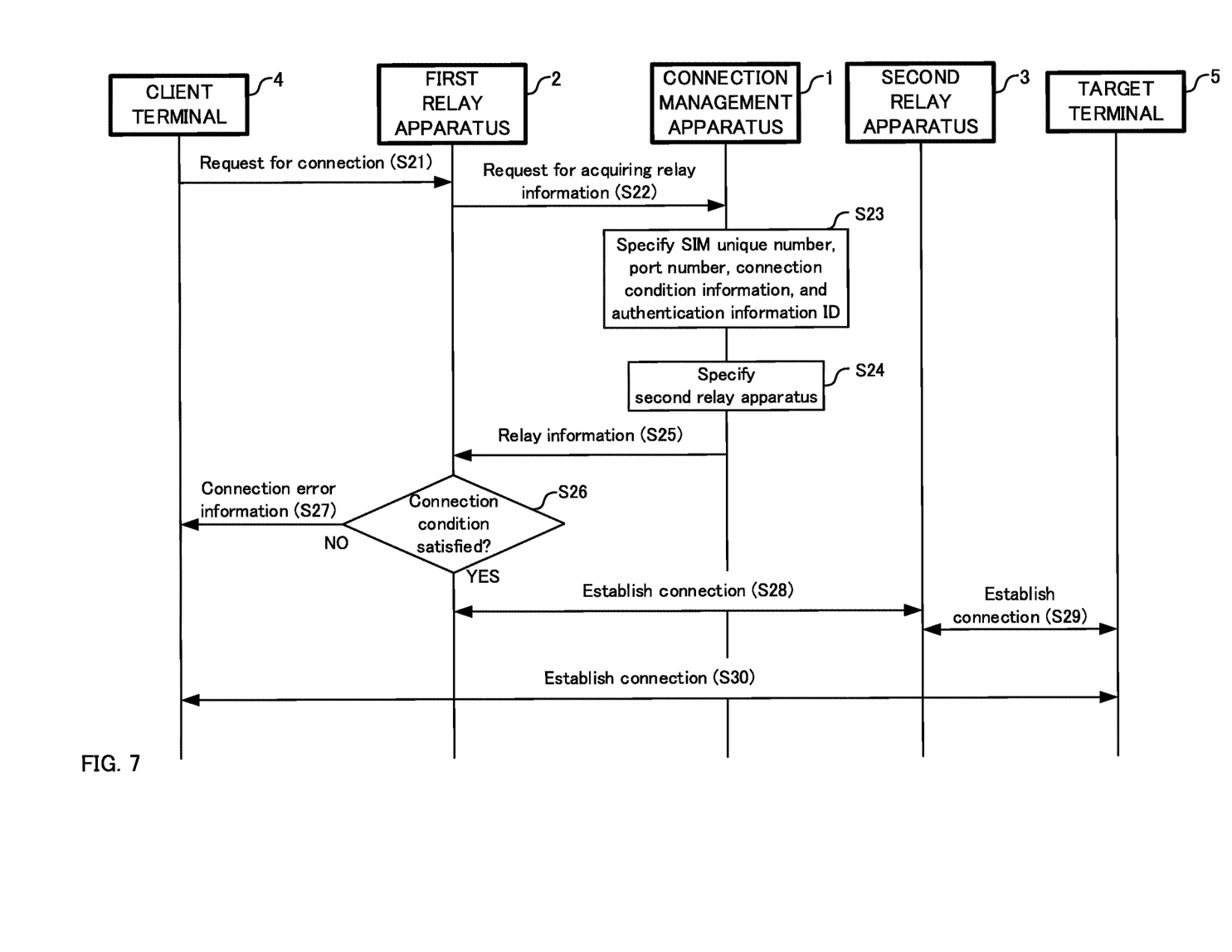
FIG. 7 is a sequence diagram showing a process related to relay of communication.

Hereinafter, the details of the function relating to relaying communication will be described. The function relating to relaying communication is achieved by the acquisition part 132, the specification part 133, and the notification part 135 of the connection management apparatus 1, the first relay part 231 of the first relay apparatus 2, and the second relay part 331 of the second relay apparatus 3. FIG. 7 is a sequence diagram showing a process relating to the relay of communication.

The first relay part 231 of the first relay apparatus 2 receives the access from the client terminal 4 by acquiring the connection request based on the connecting information from the client terminal 4 (step S21). Specifically, the first relay part 231 acquires the connection request from the client terminal 4 using a port having the port number of the first relay apparatus 2 included in the connecting information. It is assumed that the connection request includes the client information that proves that the client terminal 4 is eligible. The client information is certificate information, for example.

Next, the first relay part 231 transmits a request for acquiring relay information used for relaying communication to the connection management apparatus 1 (step S22). The request for acquiring relay information includes the IP address assigned to the first relay apparatus 2 and the port number of the port used for communication with the client terminal 4. The relay information includes the SIM unique number of the target terminal 5 that is the communication destination of the client terminal 4, the port number of the target terminal 5, the connection condition information, and the IP address of the second relay apparatus 3.

The acquisition part 132 of the connection management apparatus 1 acquires a request for acquiring relay information from the first relay apparatus 2. The specification part 133 of the connection management apparatus 1 refers to the destination entry information stored in the storage 12 and specifies the IP address of the first relay apparatus 2 included in the request for acquiring relay information, the SIM unique number of the target terminal 5 associated with the port number, the port number of the target terminal 5, the connection condition information, and the authentication information ID (step S23).

The specification part 133 specifies the second relay apparatus 3 to which the target terminal 5 is connected, on the basis of the specified SIM unique number of the target terminal 5 (step S24). Specifically, the specification part 133 refers to the connection management information for managing one or more target terminals 5 respectively connected to the plurality of second relay apparatuses 3 in the mobile network, and specifies the IP address of the second relay apparatus 3 to which the target terminal 5 of the specified SIM unique number is connected.

It is assumed that the connection management information is provided by a Packet data network GateWay (P-GW) of a 4G core network or a User Plane Function (UPF) of a 5G core network, for example, but may be managed by the connection management apparatus 1.

Next, the notification part 135 notifies the first relay apparatus 2 about the relay information including the SIM unique number of the target terminal 5, the port number of the target terminal 5, the connection condition information, and the IP address of the second relay apparatus 3, which are specified by the specification part 133 (step S25).

When the first relay part 231 of the first relay apparatus 2 acquires the relay information, the first relay part 231 determines whether or not the connection condition indicated by the connection condition information included in the acquired relay information is satisfied (step S26). If the first relay part 231 determines that the connection condition is satisfied, the first relay part 231 moves the process to step S28, and continues the process for relaying the communication between the client terminal 4 and the target terminal 5. If the first relay part 231 determines that the connection condition is not satisfied, the first relay part 231 notifies the client terminal 4 of connection error information indicating that the client terminal 4 and the target terminal 5 cannot be connected (step S27).

Specifically, the first relay part 231 determines whether or not the IP address of the client terminal 4 corresponds to the client address information included in the connection condition information. When the IP address of the client terminal 4 is included in the IP address range indicated by the client address information, the first relay part 231 determines that the IP address of the client terminal 4 corresponds to the client address information.

If the first relay part 231 determines that the IP address of the client terminal 4 does not correspond to the client address information, that is, that the IP address of the client terminal 4 is not included in the IP address range indicated by the client address information, the first relay part 231 notifies the client terminal 4 of the connection error information and stops the communication between the client terminal 4 and the target terminal 5. Thus, the first relay apparatus 2 does not communicate with the target terminal 5 when receiving access from a terminal having an IP address that is not included in the IP address range indicated by the client address information, thereby improving security.

Further, the first relay part 231 determines whether or not the client terminal 4 is eligible on the basis of the authentication information ID specified in step S23 and the client information included in the connection request. Specifically, the first relay part 231 transmits, to the connection management apparatus 1, the authentication information acquisition request that includes the authentication information ID and requests acquisition of the authentication information. When the authentication information management part 131 of the connection management apparatus 1 acquires the authentication information acquisition request, the authentication information management part 131 transmits, to the first relay apparatus 2, a) the certificate authority information and b) the public key serving as authentication information stored in the storage 12 in association with the acquired authentication information ID.

When the first relay part 231 acquires the authentication information, the first relay part 231 determines whether or not the client terminal 4 is eligible on the basis of the client information. For example, the first relay part 231 generates a hash value from the client information on the basis of the public key included in the authentication information. Then, the first relay part 231 determines whether or not the client terminal 4 is eligible by determining whether or not the hash value matches a hash value of a client terminal 4 stored in the certificate authority. If the first relay part 231 determines that the client terminal 4 is not eligible, the first relay part 231 notifies the client terminal 4 about connection error information and stops the communication between the client terminal 4 and the target terminal 5.

If the first relay part 231 determines that the IP address of the client terminal 4 corresponds to the client address information and that the client terminal 4 is eligible, the first relay part 231 moves the process to step S28. The first relay part 231 establishes a connection with the target terminal 5 through a TCP connection on the basis of the IP address of the target terminal 5 and the port number of the target terminal 5 included in the relay information acquired from the connection management apparatus 1.

Specifically, the first relay part 231 establishes a connection with the second relay apparatus 3 on the basis of the IP address of the second relay apparatus 3 included in the relay information acquired from the connection management apparatus 1 in step S25 (step S28).

When the connection with the second relay apparatus 3 is established, the first relay part 231 notifies the second relay apparatus 3 about the IP address of the target terminal 5 and the port number of the target terminal 5 included in the relay information. The second relay part 331 of the second relay apparatus 3 establishes a connection with the target terminal 5 on the basis of the IP address of the target terminal 5 and the port number of the target terminal 5 notified from the first relay apparatus 2 (step S29).

When the processing of S28 and S29 is completed, the connection between the client terminal 4 and the target terminal 5 is established (step S30). The first relay part 231 of the first relay apparatus 2 and the second relay part 331 of the second relay apparatus 3 relay the communication between the client terminal 4 and the target terminal 5. Thus, the client terminal 4 can transmit commands to the target terminal 5 or transmit and receive data to and from the target terminal 5.

The first relay part 231 of the first relay apparatus 2 relays the communication between the client terminal 4 and the target terminal 5 by communicating with the first relay apparatus 2 and the target terminal 5 using a closed network of a telecommunication company, from the first relay apparatus 2 to the target terminal 5, on the basis of the private IP address of the target terminal 5.

When the first relay part 231 relays the communication between the client terminal 4 and the target terminal 5, the first relay part 231 determines whether or not the communication between the client terminal 4 and the target terminal 5 is available on the basis of the communication expiration time included in the connection condition information. If the first relay part 231 determines that the communication is available, the first relay part 231 relays the communication between the client terminal 4 and the target terminal 5. If the first relay part 231 determines that the communication is not available, the first relay part 231 stops the communication between the client terminal 4 and the target terminal 5. When the first relay part 231 stops the communication between the client terminal 4 and the target terminal 5, the first relay part 231 notifies the client terminal 4 about the connection error information. As described above, the first relay apparatus 2 stops the communication between the client terminal 4 and the target terminal 5 when the communication expiration time has passed, and therefore security can be improved as compared with a case where the communication expiration time is not set.

When the client terminal 4 communicates with the target terminal 5, the client terminal 4 may transmit data encrypted by Secure Socket Layer (SSL) or Transport Layer Security (TLS) to the first relay apparatus 2. In this case, the first relay part 231 relays the communication between the client terminal 4 and the target terminal 5 by communicating with the client terminal 4 while encrypting data and communicating with the target terminal 5 without encrypting data.

As described above, communication can be carried out between the first relay apparatus 2 and the target terminal 5 on the basis of the private IP address of the target terminal 5, and therefore secure communication can be achieved without encrypting data between the first relay apparatus 2 and the target terminal 5. Further, since the target terminal 5 does not need to perform encryption using SSL or TLS, secure communication can be carried out even if the target terminal 5 does not support SSL or TLS.

[Variation 1]

In the above description, the first relay part 231 of the first relay apparatus 2 acquires the connection request including the authentication information ID from the client terminal 4, but the present disclosure is not limited thereto. The authentication information ID is optionally included in the connection request, and the connection request does not have to include the authentication information ID. When the authentication information ID is not included in the connection request, the first relay part 231 does not need to determine whether or not the relay is available on the basis of the authentication information ID.

[Variation 2]

The first relay part 231 of the first relay apparatus 2 may acquire, from the client terminal 4, instruction information indicating to invalidate the communication between the client terminal 4 and the target terminal 5 based on the connecting information. In this case, the first relay part 231 stops the relaying between the client terminal 4 and the target terminal 5 corresponding to the connecting information.

[Variation 3]

An example in which communication between the first relay apparatus 2 and one target terminal 5 is relayed has been described above, but the present disclosure is not limited thereto, and the communication between the first relay apparatus 2 and a plurality of target terminals 5 may also be relayed. In this case, the connection management apparatus 1 manages the connecting information, the communication expiration time, and the like of each of the plurality of target terminals 5 for one client terminal 4. Then, the process shown in FIG. 7 is performed for each of the plurality of target terminals 5, and the connections between the client terminal 4 and each of the plurality of target terminals 5 are established. In this case, the first relay part 231 of the first relay apparatus 2 may acquire one connection request indicating a request for connecting to each of the plurality of target terminals 5, and may establish connections between the first relay apparatus 2 and each of the plurality of target terminals 5 on the basis of the connection request. Thus, the client terminal 4 can transmit commands to and receive data from each of the plurality of target terminals 5 with which the connection is established.

[Variation 4]

In the above description, as the network configuration for relaying between the client terminal 4 and the target terminal 5, the network configuration in which the network from the first relay apparatus 2 to the target terminal 5 is a closed network of a telecommunications company is described as an example, but the present disclosure is not limited thereto. For example, relaying between the client terminal 4 and the target terminal 5 may be carried out in various network configurations, such as a) a network configuration in which a closed network is formed from the first relay apparatus 2 to the second relay apparatus 3, b) a network configuration in which only the first relay apparatus 2 and the second relay apparatus 3 are provided in a closed network, and c) a network configuration in which one of the first relay apparatus 2 and second relay apparatus 3 and the connection management apparatus 1 are provided in a closed network.

Effects of the Present Embodiment

As described above, in the relay system S according to the present embodiment, when the connection management apparatus 1 acquires, from the client terminal 4, the SIM unique number for identifying the target terminal 5, the connection management apparatus 1 specifies the first relay apparatus 2 that relays communication among the plurality of first relay apparatuses 2 included in the relay system S, stores the connecting information for the client terminal 4 to connect to the first relay apparatus 2 in association with the SIM unique number in the storage 12, and notifies the client terminal 4 about said connecting information. When the specified first relay apparatus 2 receives the access based on the connecting information from the client terminal 4, said first relay apparatus 2 relays the communication between the client terminal 4 and the target terminal 5 on the basis of the SIM unique number associated with the connecting information in the storage 12.

Thus, since the connecting information notified to the client terminal 4 is not always the same, it is difficult for a third party to guess the connecting information used for communication with the target terminal 5. Therefore, the client terminal 4 can securely access the target terminal 5.

Further, when the first relay apparatus 2 of the relay system S receives the access based on the connecting information including the IP address and the port number of the first relay apparatus 2 from the client terminal 4, the first relay apparatus 2 establishes a communication connection between the client terminal 4 and the target terminal 5 through the TCP connection on the basis of the SIM unique number associated with the connecting information. In this way, the relay system S can establish communication in units of a single TCP connection without tunneling all communications on the IP protocol, which allows the cost to remain low compared to existing communication methods such as VPN. Further, the relay system S can eliminate the need for an increase of communication overhead and implementation of additional functions on the devices to be accessed, compared to VPN and other tunneling communication solutions.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured to be functionally or physically distributed and integrated in arbitrary units. Further, new exemplary embodiments generated by arbitrary combinations of them are included in the exemplary embodiments of the present disclosure. The effect of the new embodiment caused by the combination has the effect of the original embodiment together.

What is claimed is:

1. A relay method performed by a relay system that relays communication between (i) a target terminal within a closed network and having a private address and (ii) a client terminal not within the closed network, the relay system including a first relay apparatus, a second relay apparatus that is connected to the target terminal, and a connection management apparatus for managing a connection at the time of relaying the communication between the client terminal and the target terminal, the method comprising:

acquiring from the client terminal a first connection request including a terminal identification information for identifying the target terminal;

the connection management apparatus, responsive to the acquiring the first connection request, specifying a connecting information indicating one port number selected from among a plurality of port numbers of the first relay apparatus for relaying the communication between the client terminal and the target terminal;

the connection management apparatus storing the connecting information and the terminal identification information in a storage in association with each other;

the connection management apparatus notifying the client terminal about the specified connecting information; and the first relay apparatus, responsive to receiving a second connection request for communicating with the target terminal, addressed to the one port number indicated by the connecting information from the client terminal, relaying communication between the client terminal and the target terminal on the basis of the terminal identification information associated with the connecting information in the storage, wherein said relaying comprises specifying the second relay apparatus to which the target terminal is connected on the basis of the terminal identification information stored in the storage, and relaying communication between the client terminal and the target terminal via the specified second relay apparatus.

2. The relay method according to claim 1, wherein the relay system includes a plurality of first relay apparatuses and a plurality of second relay apparatuses and the plurality of first relay apparatuses and the plurality of second relay apparatuses constitute a mobile network, and the target terminal is connected to the mobile network, the target terminal is assigned a private address enabling access in the mobile network, and in the relaying, the first relay apparatus relays communication between the client terminal and the target terminal by communicating with the target terminal on the basis of the private address of the target terminal.

3. The relay method according to claim 1, wherein in the storing, the relay system further stores a port number of the target terminal used for communication with the target terminal in association with the connecting information in the storage, and in the relaying, the first relay apparatus establishes a connection with the target terminal on the basis of the terminal identification information associated with the connecting information and the port number of the target terminal in the storage.

4. The relay method according to claim 3, wherein in the acquiring, the relay system further acquires the port number of the target terminal from the client terminal, and in the storing, the relay system further stores the acquired port number of the target terminal in association with the connecting information in the storage.

5. The relay method according to claim 1, wherein in the storing, the relay system stores the connecting information including the port number of the first relay apparatus in the storage, in the notifying, the relay system notifies the client terminal about the connecting information including the address and the port number of the first relay apparatus, and in the relaying, the first relay apparatus receives access based on the address and the port number of the first relay apparatus included in the connecting information from the client terminal.

6. The relay method according to claim 1, wherein in the storing, the relay system further stores the validity period information indicating a period in which the communication between the client terminal and the target terminal is available, in association with the connecting information in the storage, and in the relaying, when the first relay apparatus receives the access based on the connecting information from the client terminal, the first relay apparatus relays the communication between the client terminal and the target terminal if the first relay apparatus determines that the communication is available on the basis of the validity period information associated with the connecting information in the storage, and stops relaying of the communication between the client terminal and the target terminal if the first relay apparatus determines that the communication is not available.

7. The relay method according to claim 6, wherein in the acquiring, the relay system further acquires the validity period information from the client terminal, and in the storing, the relay system further stores the acquired validity period information in association with the specified connecting information in the storage.

8. The relay method according to claim 1, wherein in the acquiring, the relay system further acquires address information indicating an address of the client terminal when communicating with the target terminal from the client terminal, in the storing, the relay system further stores the acquired address information in association with the specified connecting information in the storage, and in the relaying, when the first relay apparatus corresponding to the connecting information receives access based on the connecting information from the client terminal, the first relay apparatus relays the communication between the client terminal and the target terminal if the relay apparatus determines that said address of the client terminal corresponds to the address information associated with the connecting information in the storage, and the first relay apparatus stops the relaying of the communication between the client terminal and the target terminal if the first relay apparatus determines that said address of the client terminal does not correspond to the address information.

9. The relay method according to claim 1, wherein in the relaying, the first relay apparatus further acquires client information indicating that the client terminal is eligible when the first relay apparatus receives the access based on the connecting information from the client terminal, relays the communication between the client terminal and the target terminal if the first relay apparatus determines that the client terminal is eligible on the basis of said client information, and stops the relaying of the communication between the client terminal and the target terminal if the first relay apparatus determines that the client terminal is not eligible.

10. The relay method according to claim 1, wherein in the relaying, the first relay apparatus relays the communication between the client terminal and the target terminal by communicating with the client terminal while encrypting data and communicating with the target terminal without encrypting data.

11. The relay method according to claim 1, wherein in the specifying the connecting information, the first relay apparatus is identified among a plurality of first relay apparatuses belonging to an area to which the client terminal belongs as the first relay apparatus that relays the communication between the client terminal and the target terminal.

12. The relay method according to claim 11, wherein
in the specifying, the connecting information of the first relay apparatuses that belong to the area to which the client terminal that requested to connect to the target terminal belongs is specified by referring to address information by areas, in which a) the connecting information of the plurality of first relay apparatuses and b) areas where the first relay apparatuses are located are associated with each other.

13. The relay method according to claim 1, wherein
in the relaying, the communication between the client terminal and the target terminal is relayed on a condition that the communication is within a communication validity period associated with the connecting information.

14. The relay method according to claim 1, further comprising
notifying, relay information including a port number of the target terminal apparatus before the relaying, the relay information being notified by the connection management apparatus.

15. A relay system including
a first relay apparatus that is configured to relay a communication between (i) a target terminal which is provided in a closed network and assigned a private address and (ii) a client terminal which is not provided in the closed network;
a second relay apparatus that is configured to connect to the target terminal; and
a connection management apparatus that is configured to manage a connection at the time of relaying the communication between the client terminal and the target terminal, wherein
the connection management apparatus includes
an acquisition part configured to acquire a first connection request including terminal identification information for identifying the target terminal from the client terminal,
a specification part configured to specify, when the first connection request is acquired, connecting information for the client terminal to connect to the first relay apparatus, the connecting information indicating one port number selected from among a plurality of port numbers of the first relay apparatus that relays the communication between the client terminal and the target terminal,
a storage controller configured to store the connecting information in a storage in association with the terminal identification information, and
a notification part configured to notify the client terminal about the specified connecting information, wherein the first relay apparatus includes
a relay part configured to relay, responsive to a receipt by the first relay apparatus of a second connection request for communicating with the target terminal, addressed to the one port number indicated by the connecting information from the client terminal, the communication between the client terminal and the target terminal on the basis of the terminal identification information associated with the connecting information in the storage,
wherein the first relay apparatus is further configured to:
specify the second relay apparatus to which the target terminal is connected on the basis of the terminal identification information stored in the storage, and
relay communication between the client terminal and the target terminal via the specified second relay apparatus.

* * * * *